United States Patent [19]

Fisher

[11] Patent Number: 5,415,429
[45] Date of Patent: May 16, 1995

[54] PNEUMATIC PRESSURE-OPERATED VEHICLE AIRBAG

[76] Inventor: Richard A. Fisher, 3229 Moritz Dr., Huntington Beach, Calif. 92649

[21] Appl. No.: 243,182

[22] Filed: May 16, 1994

[51] Int. Cl.[6] ........................................... B60R 21/28
[52] U.S. Cl. ..................... 280/741; 280/737; 280/728.1
[58] Field of Search ............. 280/728 R, 731, 732, 280/737, 734, 741, 736

[56] References Cited

U.S. PATENT DOCUMENTS

| | | | |
|---|---|---|---|
| 4,765,569 | 8/1988 | Higgins | 280/741 X |
| 5,145,208 | 9/1992 | Hoagland et al. | 280/737 X |
| 5,213,362 | 5/1993 | Coutlas | 280/736 |

*Primary Examiner*—Mitchell J. Hill
*Assistant Examiner*—Christopher P. Ellis
*Attorney, Agent, or Firm*—Charles H. Thomas

[57] ABSTRACT

A self-contained vehicle safety system is provided which can be easily installed in an automotive vehicle at occupant seating positions lacking airbag protection. Each system employs a canister containing a collapsed airbag and a compressed gas cylinder. A septum isolates the reservoir from the bag and from an air filled pneumatic line with a puncturing element that is located adjacent the septum. The pneumatic line leads to an actuator housing that preferably contains at least one linear, cylindrical passageway in which a piston is mounted for reciprocal movement. A biasing spring normally holds the piston at a position in the cylindrical cavity remote from a pressure transmission port coupled to the pneumatic line. However, in the event of a collision the inertial mass of the piston overcomes the spring and travels along the cylindrical cavity passage in the actuator housing. This compresses air within the actuator housing and expels the compressed air through the pressure transmission port and into the pneumatic line. The air pressure in the pneumatic line is directed to the piercing element, which punctures the reservoir septum, thereby releasing compressed air which immediately inflates the airbag.

16 Claims, 2 Drawing Sheets

PNEUMATIC PRESSURE-OPERATED VEHICLE AIRBAG

BACKGROUND OF THE INVENTION

1. Field of the Invention

The present invention relates to an improved actuating apparatus for inflating a vehicle occupant protection system employing an airbag.

2. Description of the Prior Art

In recent years vehicle occupant protection systems employing inflatable, cushioning airbags have been adopted by vehicle manufacturers as a means for minimizing the extent of death and injury that occurs in highway vehicles that are involved in collisions. It has become increasingly evident that the use of airbags in automotive vehicles saves many vehicle occupants from death and reduces the extent of injury of vehicle occupants involved in collisions. Therefore, more and more newer models of automotive vehicles are being equipped with manufacturer installed vehicle airbags. However, due to the expense involved, conventional vehicle airbag systems are typically provided by manufacturers only at the driver position, or at the most at the driver position and at the position of a front seat occupant of a vehicle.

A conventional occupant protection system employing an airbag involves the provision of an initially collapsed bag of air impervious material such as plastic or rubber, concealed behind a dashboard panel or positioned at the top of the steering wheel column. When a vehicle is subjected to an impact, particularly along the direction of alignment of the vehicle, a shock or inertia sensitive actuator opens a valve that admits compressed air from a compressed air reservoir into the occupant protection airbag. Alternatively, pyrotechnic actuators may be employed to inflate the airbag. With either arrangement the airbag rapidly inflates so that the occupant of a vehicle seat is pressed back into the seat, and is not thrown forward through the windshield or into the vehicle dashboard. Inflation of the airbag occurs within a split second of impact against the vehicle, since the airbag must be rapidly inflated in order to provide a cushioning effect to the vehicle occupant. Conventional airbags are equipped with pressure relief systems that quickly deflate the airbag shortly after the impact, so that a vehicle occupant is not trapped within a vehicle once the vehicle has come to rest.

Conventional vehicle airbag inflation systems employ inordinately complex crash detection mechanisms or electronic sensors. As a result, the types of actuation systems currently employed to control the inflation of occupant protection airbags in a vehicle do not lend themselves to installation in a vehicle once the manufacture of the vehicle has been completed. This is particularly unfortunate, since for many years vehicles were not provided with occupant protection airbags and most of the vehicles on the road today lack these valuable occupant protection devices. Furthermore, even new vehicles which are currently being manufactured are typically provided with protective airbags only at the driver position. While an optional airbag can be installed in front of a front seat passenger position, occupants of rear seats in a vehicle are left totally without the protection of an inflatable airbag.

The current design of conventional automotive occupant protection systems do not permit easy installation of such systems in a vehicle once the vehicle has been manufactured. The actuating components of a vehicle airbag are typically located under the hood or within the body of a vehicle. Consequently, these actuating systems are not easily accessible for retroactive installation of airbags on a vehicle. Furthermore, the designs of conventional airbag actuation systems do not permit additional airbags to be operated by an existing inflation actuating arrangement. Thus, it is not practical to add conventional airbag protection systems to occupant seating positions lacking such devices.

SUMMARY OF THE INVENTION

A primary object of the present invention is to provide an occupant protection system for a vehicle which can be installed on an existing vehicle long after the vehicle has been manufactured. The airbag protection system of the invention is self-contained in all respects. That is each occupant position is provided with a separate airbag and airbag actuation apparatus which operates independently of all other airbag systems in the vehicle. Thus, a unit of the occupant protection system of the invention can be mounted at any or all of the occupant positions in a vehicle without the necessity for interconnection to or cooperative operation with either an existing airbag system at the driver's position or with an airbag protection system at any other occupant position within the vehicle.

A further object of the invention is to provide a vehicle occupant protection system employing an airbag that is entirely mechanical in operation, and which does not require any source of electrical power for actuation. This mode of operation thus obviates any requirement for tapping into the vehicle electrical lines in order to install an occupant protection system according to the invention.

A further object of the invention is to provide a vehicle occupant protection system employing an airbag which can be installed not only on the vehicle dashboard or at the top of the vehicle steering column, but also on the backs of the front vehicle seats so as to protect the occupants of the rear seats of a vehicle. Small children in particular often ride in the rear seats of vehicles. Due to their age, inexperience, and lighter body weight children are particularly vulnerable to injury by being thrown forward against the back of the front seat, or even out of the back seating area entirely.

A further object of the invention is to provide a vehicle safety system employing an airbag that is completely self-contained and which operates totally independently of any of the vehicle control systems, and also totally independently of any other vehicle safety airbag device located in the vehicle. Such a self-contained unit lends itself to retrofitting in existing vehicles to a much greater extent than is possible with vehicle airbag systems of conventional design.

The invention involves an arrangement for retrofitting an existing automotive vehicle with a safety airbag of the type which rapidly inflates upon impact. The system of the invention is designed to be installed either on the dashboard in front of the passenger position of a conventional automotive vehicle, or on the back of the front seats to protect passengers in the rear seats.

According to the system of the invention a small impact operated inflation actuating device is provided and is mounted in a horizontal disposition either beneath the dashboard or behind one of the front seats of the vehicle. The impact inflation actuator is equipped with four spring loaded pistons. Each of the pistons resides within a separate tunnel in a cruciform array of intersecting tunnels. The tunnels are directed radially outwardly from the center of the mounting body of the inflation actuator, and intersect a common, circular annular pressure transmission passageway. The pressure transmission passageway is connected by a pneumatic line to a pressure sensitive spring intensified device. This device carries a needle which is positioned in front of a septum that until ruptured blocks the mouth of a container of pressurized air.

Each of the pistons within the inflation actuator is biased radially inwardly away from the surrounding, cross-connecting passageway by a separate, dedicated spring. In the event of a collision of the vehicle, the centrifugal force of impact will cause at least one of the pistons to travel radially outwardly within the confines of its tunnel, thereby forcing air in front of it into the peripheral, circular annular passageway. The increase in pressure in the passageway is transmitted to a pressure sensitive spring intensified device, such as that manufactured by Deep Six Corporation located in Marina Del Rey, Calif. This device in turn responds to the increased pressure by causing the needle to puncture the septum. The needle is a hollow needle having a radial port that is coupled by means of a fluid tight duct to a passenger airbag. Puncturing of the septum releases pressure within a pressurized vessel or reservoir, thus allowing the airbag to rapidly inflate.

The invention is advantageous in that it can be easily retrofitted onto an existing vehicle. Also, it is totally mechanical in nature and requires no electronic signal whatsoever for activation.

In one broad aspect the present invention may be considered to be an improvement in a vehicle occupant protection system that employs and airbag, an expandable gas source and a septum isolating the expandable gas source from the airbag. According to the improvement of the invention, an actuator housing is provided which defines at least one air filled, linear, internal passageway leading from within the actuator housing to a pressure transmission port at the exterior of the actuator housing. A movable element is located within the passageway and is initially disposed therewithin remote from the pressure transmission port. Some means is provided for checking movement of the movable element within the passageway. The system employs an air-filled pneumatic line having one end coupled to the transmission port and an opposite end terminating at the septum. A puncturing member is located at the opposite end of the pneumatic line and is disposed in a position to puncture the septum. When the actuator housing is subjected to impact jarred, the inertia of the movable element overcomes the means for checking movement and creates a pressure buildup in the pneumatic line. This actuates the puncturing member and causes it to rupture the septum. As a result, the expanding air is released from the reservoir or other air source to rapidly fill the airbag.

The means for checking movement of the movable element within the passageway may take different forms. Preferably, this function may be performed by a coil spring, or leaf spring disposed in the passageway between the pressure transmission port and the movable element. The spring exerts just enough force on the movable element to prevent it from moving along the passageway in response to routine vehicular jarring, bumps in the road, normal acceleration and deceleration of the vehicle, or in response to other forces to which a vehicle is subjected during normal use. However, in the event of a very rapid deceleration that occurs when a vehicles crashes into either a stationary or moving object, the mass of the movable element is large enough so that its inertia will tend to keep it moving, despite the halt in motion of the actuator housing in which it is located. According to the basic laws of physics, objects in motion tend to remain in motion. Therefore, when the actuator housing experiences an abrupt halt in motion, along with the body of the vehicle as will occur during a collision, the movable element will tend to continue travelling and will overcome the means for checking movement. The movable element will then travel the length of the passageway within the actuator housing.

The pneumatic line extending between the actuator housing and the pierceable septum remains filled with air at all times. The motion of the movable element in the passageway of the actuator housing acts as a piston moving within a cylindrical cavity. This compresses the air in the pneumatic line and causes the puncturing member to be released or actuated under the force of compressed air into the septum. Puncturing of the septum, which is typically located at the mouth of the compressed air reservoir, releases compressed air from the reservoir. The reservoir container is typically mounted within the airbag, which in turn is secured on the dashboard, steering wheel, or front seat back to face rearwardly. Both the source of expandable gas and the airbag are disposed within a canister that is mounted on the back of a front seat to protect the occupants of rear seats in a vehicle, or on the dashboard or steering column to protect the occupants of the front seats of a vehicle. The sudden inflation of the airbag that occurs once the septum has been pierced causes the airbag to billow out and provide a cushion against the forward motion of the body of the seat occupant. This protects the occupant of the seat from serious or even fatal injury.

In another broad aspect the invention may be considered to be an occupant protection system for a vehicle comprising an inflatable bag located adjacent an occupant seating position in the vehicle, a reservoir for holding gas in an expandable state coupled to inflate the bag through an inflation port leading thereto, a septum disposed across the inflation port, and air filled pneumatic line leading to the inflation port and having a downstream end terminating at the inflation port and an opposite upstream end, a septum piercing element located in the pneumatic line at the downstream end thereof, an actuator housing defining therewithin at least one hollow, linear tunnel filled with air and having a first end coupled in communication with the upstream end of the pneumatic line and an opposite second end, an inertial mass located in the linear tunnel remote from the first end thereof, and biasing means opposing movement of the inertial mass toward the first end of the tunnel. When the actuator housing is subjected to an impact the abrupt halt in movement of the actuator housing causes the inertial mass to overcome the biasing means. The movable mass is carried toward the first end of the tunnel by inertia. This compresses air in the pneumatic line which causes the septum piercing element to pierce the septum.

The actuator is secured to the body of vehicle. Preferably, the actuator housing is positioned beneath seat of a vehicle, so that it does not take up foot room in either the front or back seating areas. The actuator housing may be fastened by screws to the floor of the vehicle passenger compartment.

The actuator housing may be constructed with but a single, linear tunnel or passageway. The passageway may be oriented to extend horizontally parallel to the fore and aft alignment of the vehicle with the pressure transmission port directed toward the front of the vehicle and with the movable element or inertial mass located remote therefrom within the passageway. With this arrangement the movable element or inertial mass will be immediately propelled forwardly within the passageway in the event of a head-on collision, which is the most devastating type of collision that can occur. However, for greater protection it is advisable to provide the actuator housing with a number of different passageways, all oriented in different directions.

Preferably the actuator defines four horizontally disposed linear passageways oriented ninety degrees apart. Each of the linear passageways is provided with its own dedicated, separate movable actuator element. Preferably also, each of the linear passageways is formed as a cylindrical chamber or cavity and each of the movable actuator elements is formed as a piston reciprocally movable within its associated chamber. In such an arrangement it is also advisable for the actuator housing to define a cross-connecting passage therewithin that intersects all of the linear passageways or tunnels. This provides equalization of pressure within the different linear passageways.

Another optional, but preferred feature of the invention is a bleed aperture in the housing. The bleed aperture is an orifice that is in communication with the cross-connecting passage or with one or more of the linear passageways to allow pressure within the linear passageways to adjust to ambient pressure that exists about the housing. The bleed aperture orifice is much smaller than the pressure transmission port. Therefore, in the event of an impact the amount of pressure relieved through the bleed orifice is negligible, and virtually all of the pressure produced by the movement of the piston within the cylindrical cavity is transmitted through the pneumatic line and acts upon the septum puncturing member. However, the bleed orifice does allow the cavities forming the passageways within the actuator housing to be pressurized at ambient, atmospheric pressure.

The changes in ambient pressure due to barometric pressure changes are quite slow, compared to the sudden pressure change produced by movement of the inertial mass within the linear actuator housing passageway in the event of a collision. Therefore, a very tiny bleed orifice will suffice to allow the system to adjust to changes in the atmospheric pressure. To prevent any contaminants from entering the actuator housing, a micropore filter may be disposed in the bleed orifice.

The invention may be described with greater clarity and particularity by reference to the accompanying drawings.

DESCRIPTION OF THE EMBODIMENT

Figure 1:
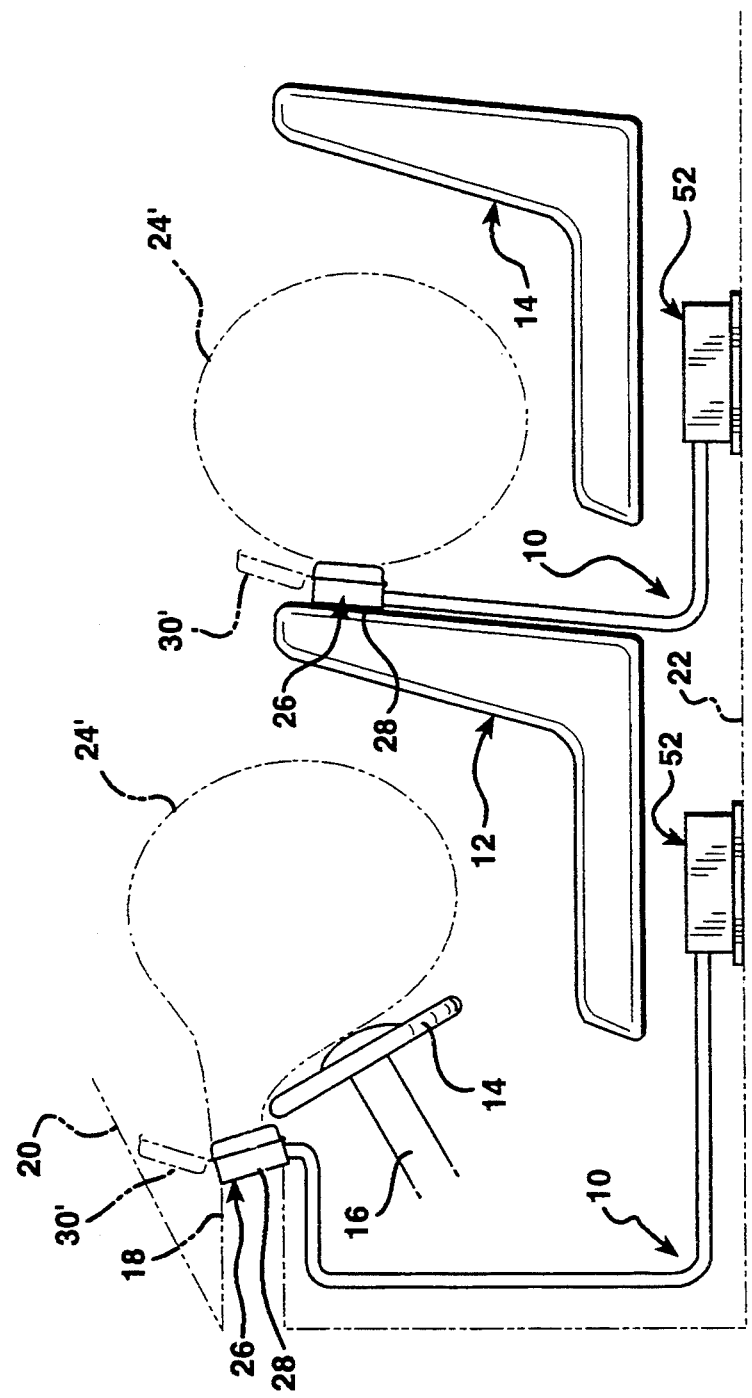
FIG. 1 is a side elevational diagram illustrating the installation of vehicle safety systems according to the invention at both and front and rear occupant seating positions in a vehicle.

FIG. 1 is a side diagrammatic view of the passenger compartment of an automotive vehicle having front occupant seating positions 12 and rear occupant seating positions 14 located immediately behind the front occupant seating positions 12. The vehicle is of a conventional design having a steering wheel 15 mounted at the top of a steering wheel column 16 directly in front of the front vehicle dashboard 18. The front windshield of the vehicle is indicated diagrammatically at 20 while the floor of the vehicle is indicated at 22.

The vehicle shown in FIG. 1 is equipped with vehicle safety airbag systems according to the invention indicated generally at 10, for both the front seats 12 and the rear seats 14. Each system 10 employs an inflatable bag 24, shown in collapsed form in FIGS. 2 and 3. The inflatable bags 24 are each located within a generally disc-shaped storage canister 26 having a generally pan shaped base 28 and a cup shaped lid 30. The canister lid 30 is hinged to the base 28 by a flexible hinge indicated at 32. Diametrically opposite the hinge 32 the lid 30 is provided with a detent catch 34 that releasably grips a radially outwardly projecting detent flange on the base 28. When the bag 24 is inflated, it forces the lid 30 outwardly, disengaging the detent catch 34, and swinging the lid 30 open away from the base 28 as illustrated at 30' in FIG. 1. The bag 24 thereupon billows out rearwardly within the vehicle passenger compartment as indicated in phantom at 24' in FIG. 1. In this condition the inflated bags 24 will cushion the occupants in the seats 12 and 14, and prevent them from being thrown forward and severely injured in the case of a collision.

The bases 28 of the bag canister 26 can be attached by flexible fabric hook and loop fastening systems, such as those sold under the registered trademark Velcro, to the back of the front seat 12 and to the dashboard 18, in the manner illustrated in FIG. 1. Alternatively, the bag canisters 26 may be secured by any other convenient means in a position where the bags 24 will be deployed to protect the seat occupants.

Figure 2:
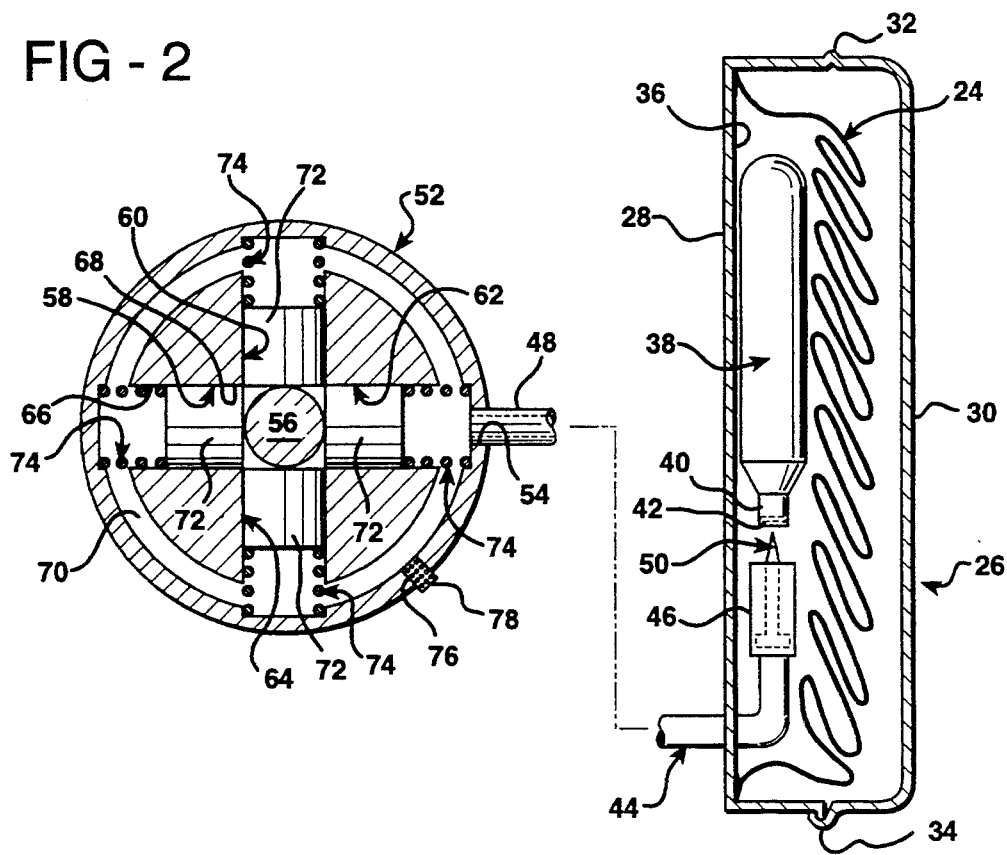
FIG. 2 is a sectional view of one of the vehicle occupant protection systems of FIG. 1 in its normal, deactivated condition.
Figure 3:
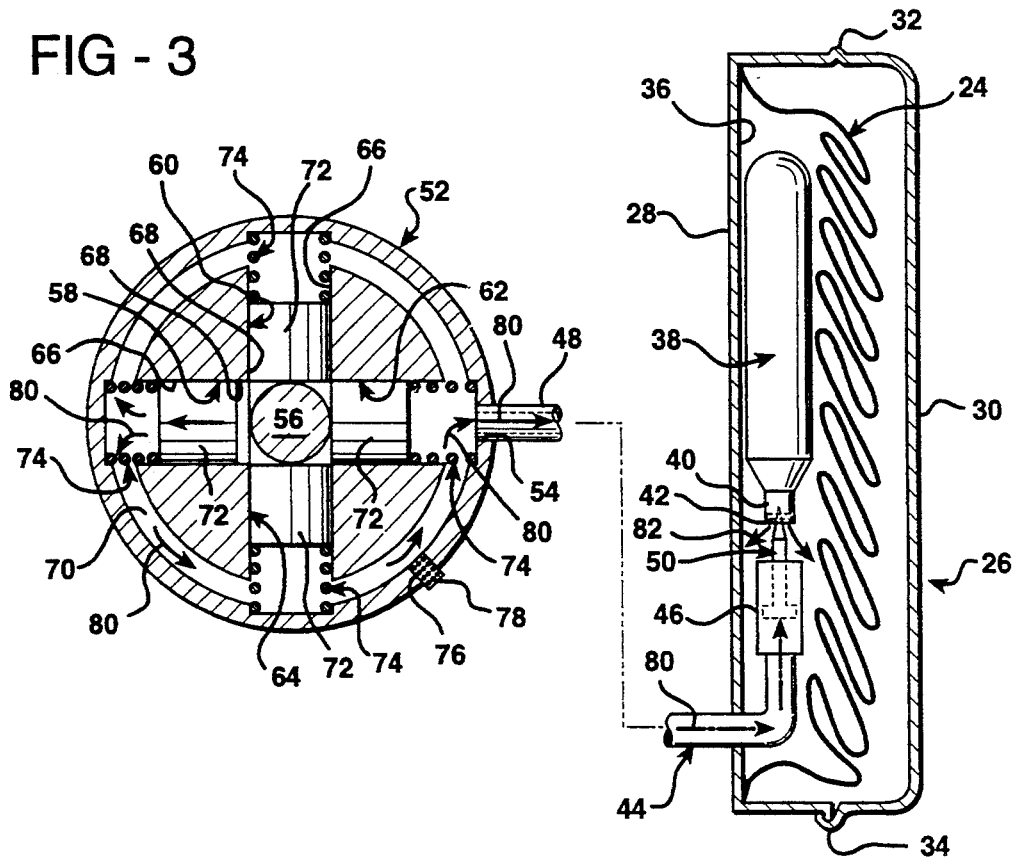
FIG. 3 is a sectional view of the airbag system of FIG. 2 as it appears when actuated.

The outer periphery of each inflatable bag 24 is sealed securely about the outer perimeter of the inside floor 36 of the canister base 28, as shown in FIGS. 2 and 3 by adhesive or other conventional means. Each of the vehicle safety airbag systems 10 includes a metal cylinder 38 containing compressed air. The cylinder 38 is located within the canister 26 between the collapsed bag 24 and the floor 36 of the canister base 28. Each compressed air reservoir cylinder 38 has a mouth 40 forming an inflation port normally closed by a septum 42. The septum 42 is disposed across the inflation port formed by the mouth 40 and normally isolates the reservoir 38 from the bag 24.

Each vehicle safety airbag system 10 also includes and air filled pneumatic line 44 having a first or downstream end 46 and a second or upstream end 48. The downstream end 46 of the pneumatic line 44 faces the septum 42 as illustrated. A piercing element or puncturing member 50 is located in the pneumatic line 44 at the second, downstream end 46 thereof. The pneumatic line 44 is a flexible hose, preferably formed of rubber or plastic, that can be threaded up through the back of the front seat and plugged into a fitting that will hold the puncturing element 50 poised to rupture the septum 42. As shown in FIG. 2, movement of the piercing element 50 into the mouth 40 will puncture the septum 42. The piercing element 50 is a spring intensified device which, when subjected to pressure in the pneumatic line 44, is driven into the septum 42, puncturing the septum 42 as illustrated in FIG. 3.

Each vehicle safety airbag system 10 has a hollow, metal, generally disc-shaped air filled actuator housing 52. The actuator housings 52 can be easily secured to the floor 22 of the vehicle using self-tapping screws. As illustrated, the actuator housings 52 are preferably located beneath the occupant seats 12 and 14 so as not to occupy foot room. The housings 52 each have a pressure transmission port 54 that is coupled in communication with the first or upstream end 48 of the associated pneumatic line 44.

Within its body, each actuator housing 52 has a vertically aligned axial center post 56 which resides at the intersection of four horizontally disposed, radially directed tunnels or passageways indicated at 58, 60, 62, and 64, as shown in FIGS. 2 and 3. The passageways 58–64 are all directed radially outwardly from the center post 56 and are radially at spaced ninety degree intervals within the actuator housing 52. Each of the hollow, linear passageways 58, 60, 62, and 64 is filled with air and has a first or radial outer end 66 coupled in communication with the upstream end 48 of the pneumatic line 44, and an opposite radial inner second end 68. Each of the radial outer or first ends 66 of the passageways 58–60 is located closer to the pressure transmission port 54, considered in the sense of direction of air movement, than are the second or radial inner ends 68.

In the embodiment shown, each actuator housing 52 further defines a peripheral, annular, cross-connecting passage 70 about its inner wall that intersects all of the outer ends 68 of the cylindrical passageways 58, 60, 62, and 64. The cross-connecting passage 70 that links the linear, cylindrical passageways 58–64 serves to provide pressure equalization between the linear passageways 58–64.

Each vehicle safety airbag system 10 also includes a movable actuator element 72 in the form of a cylindrical piston that extends across the cross-sectional area of each of the linear passageways 58–64 and is substantially coextensive in area therewith. The system may be provided with a small amount of lubricant so that each of the pistons 72 slides within its associated passageway 58, 60, 62, or 64 in contact therewith, but with a minimum of friction thereagainst.

Each vehicle safety airbag system 10 also includes a means for restraining the actuator pistons 72 from leaving the second or inner ends 63 of the passageways 58–64. This restraining or movement checking means is preferably formed of some type of biasing means, such as the compressed coil springs 74 that are illustrated. The coil springs 74 are oriented coaxially with the pistons 72 and in their respective passageways 58–64 and are seated in radially inwardly facing concave depressions in the outer wall of the annular cross-connecting passage 70.

The springs 74 are interposed between the structure of the housing 52 and the pistons 74 to urge the pistons 74 radially inwardly within their respective passageways 58–64 and into contact with the center post 56. The pistons 72 are thereby initially disposed within their respective passageways 58–64 remote from the pressure transmission port 54, considered in the context of air flow from the actuator housing 52 to the pneumatic line 44. The pistons 72 thereby serve as inertial masses located in their respective passageways 58–64 remote from the first ends 66 thereof. The compressed, biasing coil springs 74 thereby oppose movement of the inertial masses of the pistons 74 toward the first end or radial outer ends 66 of all of the passageways 58–64, as illustrated in FIG. 2.

Each actuator housing 52 also includes a pressure equalizing orifice 76 within which a micropore filter 78 is positioned. The pressure equalizing orifice 76 is in communication with the cross-connecting passageway 70 and the linear, cylindrical passageways 58–64 to allow static pressure of the air in the passageways 58–64 to adjust to barometric changes in ambient air pressure outside of the actuator housing 52. The pressure equalizing orifice 76 thereby serves as a bleed aperture in the actuator housing 52. The bleed aperture 76 is located in the exterior wall of the actuator housing 52.

During normal operation of the vehicle, the operative elements of all of the vehicle safety airbag systems 10 remain as illustrated in FIG. 2. That is, the coil springs 74 urge all of the pistons 72 radially inwardly toward the second or inboard ends 68 of each of the cylindrical, linear passageways 58–64. However, in the event that the actuator housing 52 is severely jarred, as occurs when it is subjected to an impact due to a collision of the vehicle, the inertia of the piston 72 most closely facing the oncoming direction of impact will overcome the bias of the spring 74 acting thereagainst.

For example, as illustrated in FIG. 3, the actuator housing 52 is illustrated in the condition of having just received a violent impact from the left. If the vehicle and actuator housing 52 were initially moving to the left, as viewed in FIG. 3, the impact would abruptly halt movement of the vehicle and hence also the actuator housing 52. However, since the pistons 74 are mounted for reciprocal movement within the cylindrical passageways 58–64, the piston 74 in the passageway 58 will tend to remain in motion in the direction in which it has theretofore been travelling. Therefore, the inertial mass of the piston 72 residing in the cylindrical passageway 58 will carry the piston 72 from the second end 68 toward the first end 66 of the cylindrical passageway 58.

As illustrated in FIG. 3, this will result in an expulsion of air, indicated by the directional arrows 80, from the linear, cylindrical passageway 58. Because all of the passageways 58–64 lead to the pressure transmission port 54 through the cross-connecting annular passageway 70, the piston 74 in the cylindrical passageway 58 will force air out of that passageway and through the pressure transmission port 54.

The compressed air, upon entering the upstream end 48 of the pneumatic line 44, acts upon the piercing element 50 at the downstream end 46 of the pneumatic line 44. That is, the air that is pushed through the pressure transmission port 54 into the pneumatic line 44 drives the piercing element 50 out of the downstream end 46 of the pneumatic line 44, thereby causing the piercing element 50 to puncture or pierce the septum 42, also as shown in FIG. 3. When this occurs, the compressed air in the compressed air reservoir 38 rushes out of the reservoir mouth 40 through the ruptured septum 42, as indicated by the directional arrows 82.

The expanding air from the reservoir 38 rapidly inflates the bag 24 from the collapsed condition depicted in FIG. 3, to the inflated condition indicated at 24' in FIG. 1. The pressure from the rapidly inflating bag 24 easily disengages the detent catch 34 and swings about the hinge 32 pushes the lid 30 of the canister 26 out of the way, thus swinging it clear of the canister body 28 so that the bag 24 is fully deployed as a billowing cushion to protect the occupants of the seats 12 and 14 from injury.

It should be noted that the vehicle occupant protection systems 10 require no connections to the electrical or pneumatic systems of the vehicle. Also, their operation is strictly mechanical. As shown, each of the vehicle safety airbag systems 10 is entirely self-contained and operates independently of the other systems, and of the vehicle itself. The vehicle safety airbag systems 10 can be easily retrofitted into an automotive vehicle lacking airbag protection for some or all of the occupant seating positions. The installation of the occupant protection systems 10 is so simple that minimal mechanical expertise is required to complete the installation. Following simple instructions, virtually any owner of a vehicle can install the device.

Undoubtedly, numerous variations and modifications of the invention will become readily apparent to those familiar with vehicle occupant protection systems. For example, the puncturing element 50 may be utilized to actuate a pyrotechnic inflation mechanism, rather than release compressed air as shown in the embodiment illustrated. Also, detent restraining devices can be substituted for the springs 74. Accordingly, the scope of the invention should not be construed as limited to the specific embodiment illustrated and described.

I claim:

1. In a vehicle occupant protection system employing an airbag, a expandable gas source and a septum isolating said expandable gas source from said airbag, the improvement comprising an actuator housing defining at least one air filled, linear, internal passageway leading from within said actuator housing to a pressure transmission port at the exterior thereof, a movable element located within said passageway and initially disposed therewithin remote from said pressure transmission port, means for checking movement of said movable element within said passageway, an air filled pneumatic line having one end coupled to said pressure transmission port and an opposite end terminating at said septum, and a puncturing member located at said opposite end of said pneumatic line and disposed in a position to puncture said septum, whereby when said actuator housing is subjected to impact, the inertia of said movable element overcomes said means for checking movement and creates a pressure buildup in said pneumatic line, thereby pushing said puncturing member to rupture said septum.

2. A vehicle occupant protection system according to claim 1 wherein said actuator housing defines a plurality of linear internal passageways, all horizontally disposed and extending in different directions, and wherein each of said passageways is provided with a separate movable element as aforesaid.

3. A vehicle occupant protection system according to claim 1 wherein said passageway is a cylindrical cavity and said movable element is a piston mounted for reciprocal movement within said cylindrical cavity.

4. A vehicle occupant protection system according to claim 1 wherein said means for checking movement is comprised of a compressed coil spring disposed in said passageway between said pressure transmission port and said movable element.

5. A vehicle occupant protection system according to claim 1 further comprising a pressure equalization orifice in said actuator housing in communication with said passageway to allow static pressure of air in said passageway to adjust to changes in ambient air pressure outside of said actuator housing.

6. In a vehicle occupant protection system employing an inflatable bag located adjacent an occupant seating position in a vehicle and a reservoir of pressurized gas for inflating said bag, an improved actuation system comprising: a septum isolating said reservoir from said bag, an air filled pneumatic line having first and second ends, wherein said second end of said pneumatic line is positioned to face said septum, a piercing element located in said pneumatic line at said second end thereof, an air filled actuator housing having a port that is in communication with said first end of said pneumatic line, at least one linear passageway defined within said housing and having first and second ends, wherein said first end of said passageway is closer to said port than is said second end of said passageway, a movable actuator element initially located in said linear passageway at said second end thereof, and means for restraining said actuator from leaving said second end of said passageway, wherein upon impact against said vehicle the inertia of said actuator element overcomes said means for restraining and propels said actuator element along said passageway, compressing the air therein, which pushes said piercing element into said septum, thereby opening a path of inflation from said reservoir to said bag.

7. A vehicle occupant protection system according to claim 6 further comprising four horizontally disposed linear passageways defined within said housing, said passageway being oriented ninety degrees apart within said housing, and wherein each of said linear passageways is provided with a separate movable actuator element as aforesaid.

8. A vehicle occupant protection system according to claim 7 wherein each of said linear passageways is formed as a cylindrical chamber and each of said movable actuator elements is formed as a piston reciprocally movable within an associated one of said chambers.

9. A vehicle occupant protection system according to claim 8 wherein said housing further defines a cross-connecting passage therewithin that interconnects all of said linear passageways to provide equalization of pressure therebetween.

10. A vehicle occupant protection system according to claim 9 further comprising a bleed aperture in said housing in communication with said cross-connecting passage to allow pressure therewithin to adjust to ambient pressure about said housing.

11. A vehicle occupant protection system according to claim 7 wherein said means for restraining is comprised of four separate compressed coil springs disposed in said passageways and interposed between said first ends of said passageways and said movable actuator elements.

12. A occupant protection system for a vehicle comprising: an inflatable bag located adjacent an occupant seating position in said vehicle, a reservoir for holding gas in an expandable state coupled to inflate said bag through an inflation port leading thereto, a septum disposed across said inflation port, an air filled pneumatic line leading to said inflation port and having a downstream end terminating at said inflation port and an opposite, upstream end, a septum piercing element located in said pneumatic line at said downstream end thereof, an actuator housing defining therewithin at least one hollow, linear tunnel filled with air and having a first end coupled in communication with said upstream end of said pneumatic line and an opposite second end, an inertial mass located in said linear tunnel remote from said first end thereof, and biasing means opposing movement of said inertial mass toward said first end of said tunnel, whereupon when said actuator housing is subjected to an impact said inertial mass overcomes said biasing means and is carried toward said first end of said tunnel by inertia, thereupon compressing air in said pneumatic line which causes said septum piercing element to pierce said septum.

13. An occupant protection system according to claim 12 wherein said actuator housing has a center and defines therewithin four of said tunnels, all disposed horizontally and directed radially outwardly from said center ninety degrees apart, and further comprising a separate inertial mass as aforesaid disposed within each one of said tunnels.

14. An occupant protection system according to claim 13 wherein said actuator housing further defines cross-connecting passage means intersecting all of said linear tunnels to equalize pressure therebetween.

15. An occupant protection system according to claim 12 wherein said actuator housing further defines a bleed orifice in communication with said linear tunnel and with the exterior of said housing to thereby maintain static pressure within said linear tunnel at the ambient, atmospheric pressure about said housing.

16. An occupant protection system according to claim 12 wherein said biasing means is a compressed coil spring located in said first end of said linear tunnel and to bear against said inertial mass.

* * * * *